US008392649B2

(12) United States Patent (10) Patent No.: US 8,392,649 B2
Yeh (45) Date of Patent: Mar. 5, 2013

(54) MEMORY STORAGE DEVICE, CONTROLLER, AND METHOD FOR RESPONDING TO HOST WRITE COMMANDS TRIGGERING DATA MOVEMENT

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 315 days.

(21) Appl. No.: 12/976,989

(22) Filed: Dec. 22, 2010

(65) Prior Publication Data

US 2012/0131263 A1 May 24, 2012

(30) Foreign Application Priority Data

Nov. 22, 2010 (TW) ................................ 99140192 A

(51) Int. Cl.
*G06F 12/00* (2006.01)
(52) U.S. Cl. ........ 711/103; 711/154; 711/156; 711/165; 365/185.33
(58) Field of Classification Search .................. 711/103, 711/154, 156, 165; 365/185.33
See application file for complete search history.

(56) References Cited

U.S. PATENT DOCUMENTS

| | | | |
|---|---|---|---|
| 6,978,342 B1 * | 12/2005 | Estakhri et al. ............... 711/103 |
| 7,062,618 B2 * | 6/2006 | Tsunoda et al. .............. 711/154 |
| 7,076,606 B2 * | 7/2006 | Orsley ......................... 711/114 |
| 7,243,193 B2 * | 7/2007 | Walmsley ..................... 711/154 |
| 7,266,661 B2 * | 9/2007 | Walmsley ..................... 711/164 |
| 7,475,184 B2 * | 1/2009 | Lee ............................... 711/103 |
| 7,941,593 B2 * | 5/2011 | Lee ............................... 711/103 |
| 8,180,981 B2 * | 5/2012 | Kapil et al. .................... 711/159 |
| 2008/0306723 A1 * | 12/2008 | De Ambroggi et al. ........ 703/21 |
| 2008/0320209 A1 * | 12/2008 | Lee et al. ....................... 711/103 |
| 2010/0023682 A1 * | 1/2010 | Lee et al. ....................... 711/103 |
| 2010/0125772 A1 * | 5/2010 | Cheng et al. .................. 714/758 |
| 2010/0228906 A1 * | 9/2010 | Ramiya Mothilal et al. . 711/103 |
| 2011/0219172 A1 * | 9/2011 | Lin ............................... 711/103 |
| 2012/0089854 A1 * | 4/2012 | Breakstone et al. .......... 713/323 |

* cited by examiner

*Primary Examiner* — Stephen Elmore

(74) *Attorney, Agent, or Firm* — Jianq Chyun IP Office

(57) ABSTRACT

A memory storage device, a memory controller thereof, and a method for responding host commands are provided. The memory storage device has a flash memory chip and a buffer memory. The present method includes receiving a write command issued by a host system and determining whether the write command causes the memory storage device to trigger a data moving procedure. If the write command does not cause the memory storage device to trigger the data moving procedure, the present method further includes sending an acknowledgement message corresponding to the write command to the host system after data corresponding to the write command is completely transferred to the buffer memory.

21 Claims, 6 Drawing Sheets

MEMORY STORAGE DEVICE, CONTROLLER, AND METHOD FOR RESPONDING TO HOST WRITE COMMANDS TRIGGERING DATA MOVEMENT

CROSS-REFERENCE TO RELATED APPLICATION

This application claims the priority benefit of Taiwan application serial no. 99140192, filed on Nov. 22, 2010. The entirety of the above-mentioned patent application is hereby incorporated by reference herein and made a part of this specification.

BACKGROUND

1. Technology Field

The present invention generally relates to a method for responding host commands, and more particularly, to a memory storage device and a memory controller using the same.

2. Description of Related Art

Along with the widespread of digital cameras, cell phones, and MP3 in recently years, the consumers' demand to storage media has increased drastically. Flash memory is one of the most adaptable storage media to such portable electronic products due to its many characteristics such as data non-volatility, low power consumption, small volume, and non-mechanical structure.

Regarding a storage device using a flash memory as its storage medium, when a host system issues a write command to the storage device, a buffer memory in the storage device first receives data transferred from the host system. After the data is completely transferred to the buffer memory, the storage device stores the data temporarily stored in the buffer memory into the flash memory. The storage device sends an acknowledgement message back to the host system after executing the write command to notify the host system to issue a next command.

However, after the host system receives the acknowledgement message from the storage device, it needs to wait for some time (about 40 µs) before issuing a new command. Namely, the storage device is in an idle state during aforementioned waiting time. Thereby, how to shorten the idle time of the storage device and improve the efficiency thereof for processing host commands has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a host command responding method that allows a host system to issue a next command in advance and prevent the execution of the next command from timing out.

The present invention is also directed to a memory controller that allows a host system to issue a next command in advance and prevents the execution of the next command from timing out.

The present invention is further directed to a memory storage device that allows a host system to issue a next command in advance and prevents the execution of the next command from timing out.

The present invention provides a host command responding method adaptable to a memory storage device, wherein the memory storage device has a flash memory chip and a buffer memory. In the host command responding method, a write command issued by a host system is received, and whether the write command causes the memory storage device to trigger a data moving procedure is determined. If the write command does not cause the memory storage device to trigger the data moving procedure, an acknowledgement message corresponding to the write command is sent to the host system after data corresponding to the write command is completely transferred to the buffer memory.

The present invention also provides a memory controller including a host interface, a memory interface, a buffer memory, and a memory management circuit. The host interface is configured to couple a host system. The memory interface is configured to couple a flash memory chip. The memory management circuit is coupled to the host interface, the memory interface, and the buffer memory. The memory management circuit receives a write command issued by the host system and determines whether the write command triggers a data moving procedure. If the write command does not trigger the data moving procedure, the memory management circuit further sends an acknowledgement message corresponding to the write command to the host system after data corresponding to the write command is completely transferred to the buffer memory.

The present invention further provides a memory storage device including a connector, a flash memory chip, and a memory controller. The connector is configured to couple a host system. The memory controller is coupled to the flash memory chip and the connector and includes a buffer memory. The memory controller receives a write command issued by the host system and determines whether the write command triggers a data moving procedure. If the write command does not trigger the data moving procedure, the memory controller sends an acknowledgement message corresponding to the write command to the host system after data corresponding to the write command is completely transferred to the buffer memory.

As described above, in the present invention, the time point for sending an acknowledgement message corresponding to a write command received from a host system to the host system is determined according to whether the write command causes the memory storage device to trigger a data moving procedure. If the write command does not trigger the data moving procedure, the acknowledgement message is sent to the host system before the execution of the write command is finished, so that the host system can issue a next command in advance. If the write command triggers the data moving procedure, the acknowledgement message is sent to the host system after the execution of the data moving procedure is completed, so that the execution of the next command is prevented from timing out.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incor

DESCRIPTION OF THE EMBODIMENTS

Figure 1A:
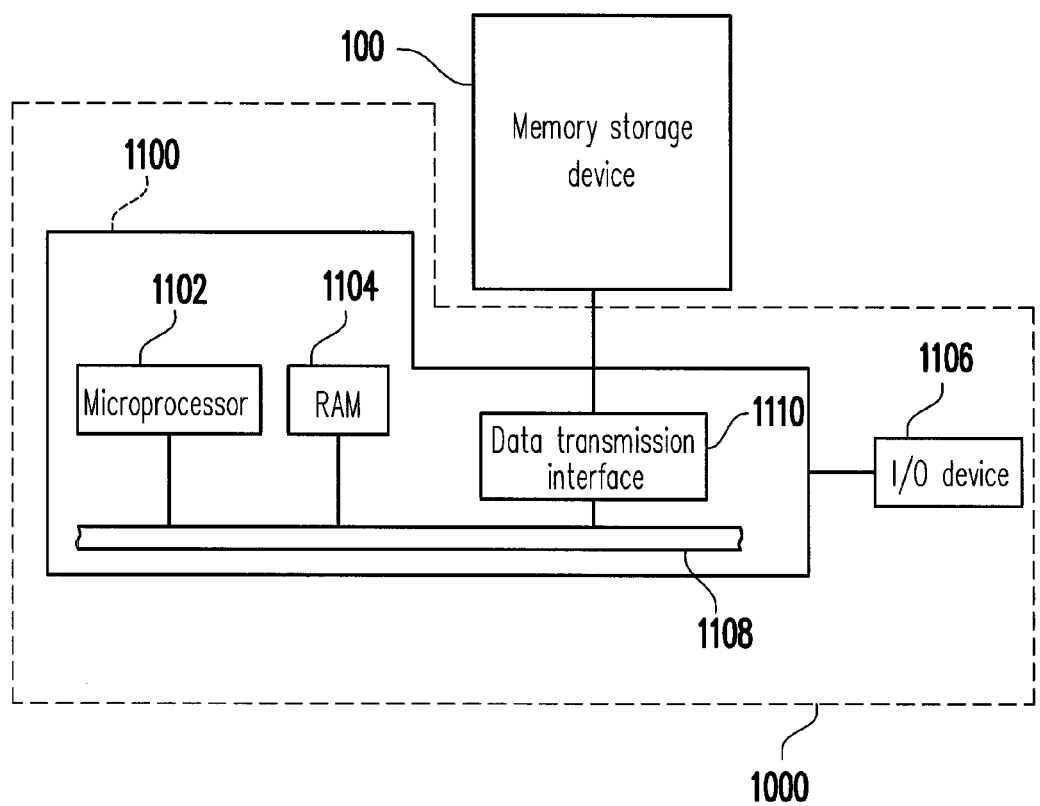
- FIG. 1A is a diagram of a host system using a memory storage device according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also referred to as a memory storage system) includes a memory chip and a controller (also referred to as a control circuit). A memory storage device is usually used together with a host system so that the host system can write data into or read data from the memory storage device. In addition, the memory storage device may also include an embedded memory and a software that can be executed by the host system to substantially act as a controller of the embedded memory.

FIG. 1A is a diagram of a host system using a memory storage device according to an exemplary embodiment of the present invention.

Figure 1B:
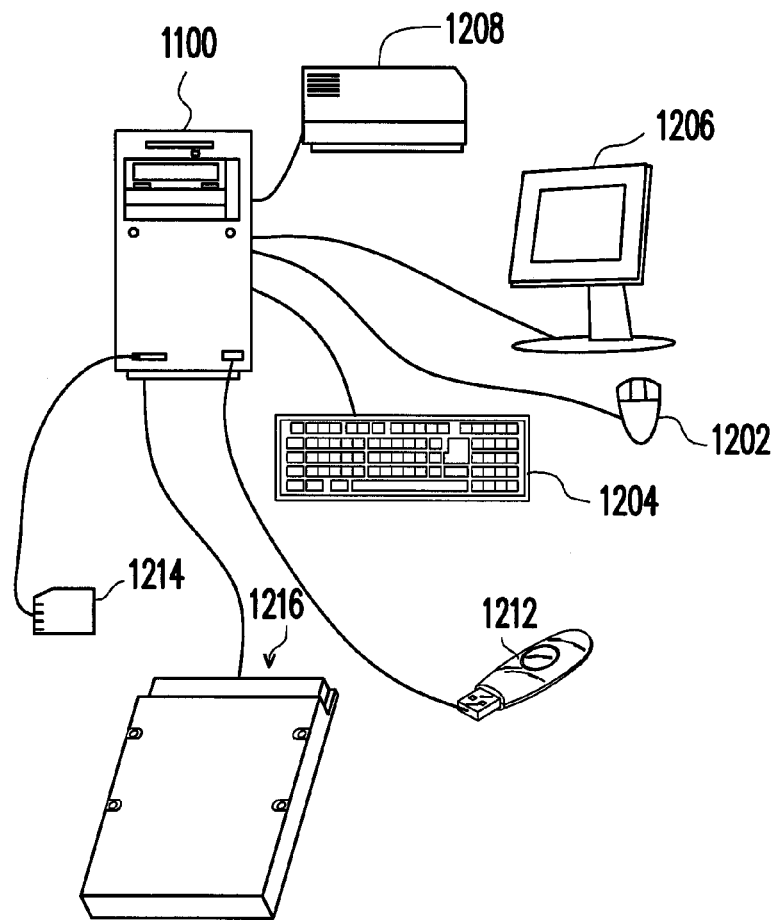
FIG. 1B is a diagram of a computer, an input/output (I/O) device, and a memory storage device according to an exemplary embodiment of the present invention.

The host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

In the present exemplary embodiment, a memory storage device 100 is coupled to other components of the host system 1000 through the data transmission interface 1110. Through the operations of the microprocessor 1102, the RAM 1104, and the I/O device 1106, the host system 1000 can write data into the memory storage device 100 or read data from the same. The memory storage device 100 may be a memory card 1214, a flash drive 1212, or a solid state drive (SSD) 1216, as shown in FIG. 1B.

Figure 1C:
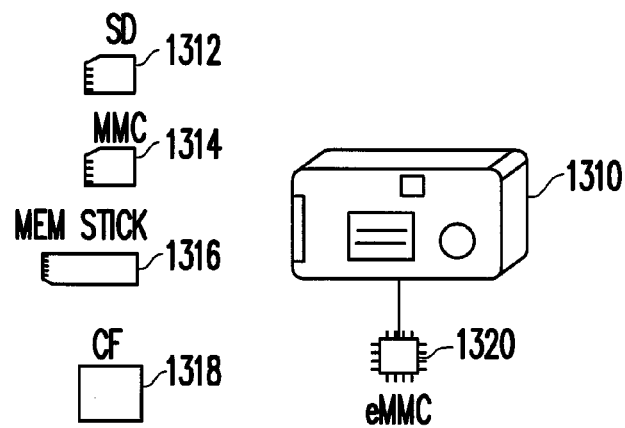
FIG. 1C is a diagram of a host system and a memory storage device according to another exemplary embodiment of the present invention.

Generally speaking, the host system 1000 may be any system that can store data. Even though the host system 1000 is described as a computer system in the present exemplary embodiment, the host system 1000 may also be a cell phone, a digital camera, a video camera, a communication device, an audio player, or a video player in another exemplary embodiment of the present invention. For example, if the host system is a digital camera 1310, the memory storage device is then a secure digital (SD) card 1312, a multimedia card (MMC) 1314, a memory stick (MS) 1316, a compact flash (CF) card 1318, or an embedded storage device 1320 (as shown in FIG. 1C) used by the digital camera 1310. The embedded storage device 1320 includes an embedded MMC (eMMC). It should be mentioned that an eMMC is directly coupled to the motherboard of a host system.

Figure 2:
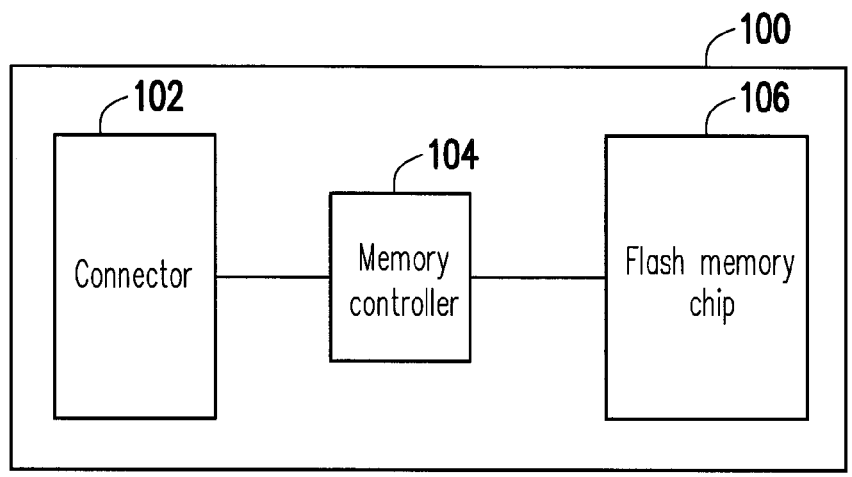
FIG. 2 is a schematic block diagram of the memory storage device in FIG. 1A.

FIG. 2 is a block diagram of the memory storage device 100 in FIG. 1A. Referring to FIG. 2, the memory storage device 100 includes a connector 102, a memory controller 104, and a flash memory chip 106.

The connector 102 is coupled to the memory controller 104 and configured to couple the host system 1000. In the present exemplary embodiment, the connector 102 may comply with a serial advanced technology attachment (SATA) interface. However, the type of the connector 102 is not limited thereto, and in other exemplary embodiments, the connector 102 may comply with any suitable interface, such as a universal serial bus (USB) interface, a MMC interface, a parallel advanced technology attachment (PATA) interface, an Institute of Electrical and Electronic Engineers (IEEE) 1394 interface, a peripheral component interconnect (PCI) express interface, a secure digital (SD) interface, a MS interface, a CF interface, or an integrated drive electronics (IDE) interface.

The memory controller 104 executes a plurality of logic gates or control instructions implemented in a hardware or firmware form and performs various data operations on the flash memory chip 106 according to instructions of the host system 1000. Herein the memory controller 104 further determines the time for responding the host system 1000 after receiving a command from the host system 1000 through the host command responding method provided by the present exemplary embodiment. The host command responding method provided by the present exemplary embodiment will be described later on with reference to accompanying drawings.

The flash memory chip 106 is coupled to the memory controller 104 and configured for storing file system information (for example, a file allocation table (FAT) or a new technology file system (NTFS)) and general data (for example, text, video, or audio files). The flash memory chip 106 may be a multi level cell (MLC) NAND flash memory chip. However, the present invention is not limited thereto, and the flash memory chip 106 may also be a single level cell (SLC) NAND flash memory chip, any other flash memory chip, or any memory chip with the same characteristics.

In the present exemplary embodiment, the flash memory chip 106 is composed of a plurality of physical blocks. Each of the physical blocks includes a plurality of physical addresses (i.e., physical pages), and the physical pages belonging to the same physical block can be written individually but have to be erased all together. To be specific, physical block is the smallest unit for erasing data, and physical page is the smallest unit for writing data.

The physical blocks of the flash memory chip 106 are logically grouped into a system area, a data area, a spare area, and a replacement area. The physical blocks in the system area are used for storing important information related to the memory storage device 100, and the physical blocks in the replacement area are used for replacing damaged physical blocks in the system area, the data area or the spare area. Thus, in a general access state, the host system 1000 cannot access the physical blocks in the system area and the replacement area. The physical blocks in the data area are used for storing data written by write commands issued by the host system 1000, and the physical blocks in the spare area are used for substituting the physical blocks in the data area when the write commands are executed. For example, when the memory storage device 100 receives a write command from the host system 1000 and accordingly is about to update (or write) data into a specific physical page of a specific physical block in the data area, the memory controller 104 selects a physical block from the spare area and writes the valid old data in the physical block to be updated and the new data into the physical block selected from the spare area. Then, the memory controller 104 logically links the physical block containing the valid old data and the new data to the data area and erases the physical block to be updated in the data area and logically links it to the spare area. If the write command issued by the host system 1000 causes data in two physical blocks of the flash memory chip 106 to be merged, the write command causes the memory storage device 100 to trigger a data moving procedure. In other words, the memory controller 104 in the memory storage device 100 executes the data moving procedure.

In addition, each physical block of the flash memory chip 106 can only be erased for a limited number of times. For example, a physical block is worn out after it is erased for 10,000 times. Thus, when physical block wearing causes the storage capacity of the flash memory chip 106 to decrease or the performance thereof to deteriorate, data stored in the flash memory chip 106 may be lost, or data may not be stored into the flash memory chip 106 anymore. Generally speaking, the wearing of a physical block is determined by how many times the physical block is programmed (i.e., written) or erased. For example, when the host system 1000 repeatedly writes data into a same logical block address, the physical block of the flash memory chip 106 that have the same physical address is repeatedly written and erased and accordingly has relatively higher wear.

Generally speaking, the performance of the flash memory chip 106 is reduced as long as there is wear on the physical blocks. To be specific, besides the performance deterioration of the worn blocks, the performance of the entire flash memory chip 106 is affected when there are not enough normal blocks for storing data. Thus, when the number of worn blocks in the flash memory chip 106 exceeds a threshold, the flash memory chip 106 is considered unusable even if there are still normal blocks therein. Some storage resources are wasted since the normal blocks are substantially considered unusable.

In order to prolong the lifespan of the flash memory chip 106, the memory controller 104 tries to use the blocks in the flash memory chip 106 evenly. In order to achieve this purpose, the memory controller 104 performs data moving operations to wear leveling after accessing the flash memory chip 106 for some time. In other words, the memory controller 104 may also execute a data moving procedure for wear leveling.

Figure 3:
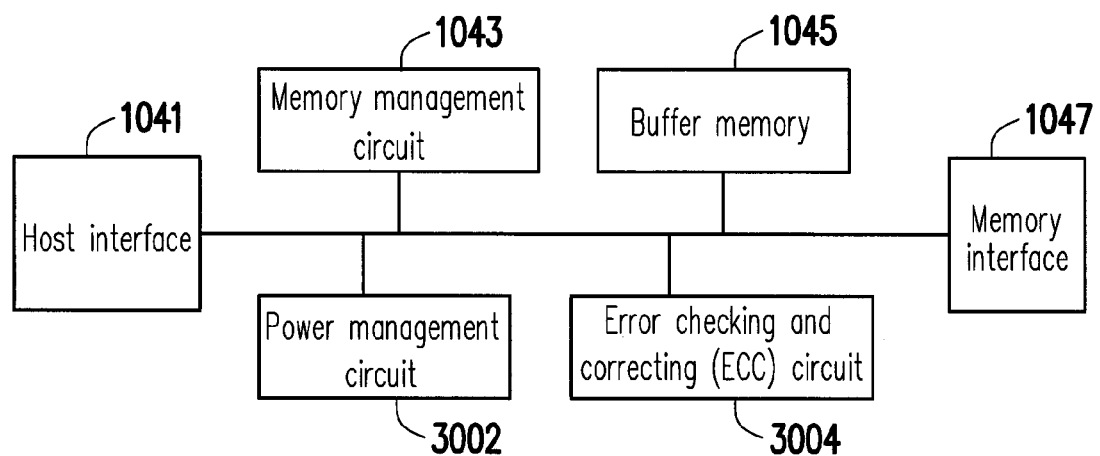
FIG. 3 is a schematic block diagram of a memory controller according to an exemplary embodiment of the present invention.

FIG. 3 is a schematic block diagram of a memory controller according to an exemplary embodiment of the present invention. Referring to FIG. 3, the memory controller 104 includes a host interface 1041, a memory management circuit 1043, a buffer memory 1045, and a memory interface 1047.

The host interface 1041 is coupled to the memory management circuit 1043 and configured to couple the host system 1000 through the connector 102. The host interface 1041 receives and identifies commands and data sent by the host system 1000. Accordingly, the commands and data sent by the host system 1000 are transferred to the memory management circuit 1043 through the host interface 1041. In the present exemplary embodiment, the host interface 1041 is, corresponding to the connector 102, a SATA interface, while in other exemplary embodiments, the host interface 1041 may also be a USB interface, a MMC interface, a PATA interface, an IEEE 1394 interface, a PCI Express interface, a SD interface, a MS interface, a CF interface, an IDE interface, or an interface conforming to any other standard.

The memory management circuit 1043 controls the operation of the memory controller 104. To be specific, the memory management circuit 1043 has a plurality of control instructions, and when the memory storage device 100 is in operation, the control instructions are executed to accomplish the host command responding method provided by the present exemplary embodiment.

In an exemplary embodiment, the control instructions of the memory management circuit 1043 are implemented in a firmware form. For example, the memory management circuit 1043 has a microprocessor unit (not shown) and a read-only memory (ROM, not shown), and the control instructions are burnt into the ROM. When the memory storage device 100 is in operation, the control instructions are executed by the microprocessor unit to accomplish the host command responding method in the present exemplary embodiment.

In another exemplary embodiment of the present invention, the control instructions of the memory management circuit 1043 may also be stored in a specific area of the flash memory chip 106 (for example, the system area exclusively used for storing system data in the flash memory chip 106) as a program code. Besides, the memory management circuit 1043 has a microprocessor unit (not shown), a ROM (not shown), and a RAM (not shown). The ROM has a driving code segment, and when the memory controller 104 is enabled, the microprocessor unit first executes the driving code segment to load the control instructions from the flash memory chip 106 into the RAM of the memory management circuit 1043. Then, the microprocessor unit runs these control instructions to execute the host command responding method in the present exemplary embodiment. In yet another exemplary embodiment of the present invention, the control instructions of the memory management circuit 1043 may also be implemented in a hardware form.

The buffer memory 1045 is coupled to the memory management circuit 1043 and configured for temporarily storing data from the host system 1000 or the flash memory chip 106. To be specific, when the host system 1000 is about to write data into the memory storage device 100, the data corresponding to the write command is temporarily written into the buffer memory 1045 first, and then the data in the buffer memory 1045 is written into the flash memory chip 106 by the memory management circuit 1043.

The memory interface 1047 is coupled to the memory management circuit 1043 and configured to couple the memory controller 104 and the flash memory chip 106. Accordingly, the memory controller 104 can perform relative operations on the flash memory chip 106. Namely, data to be written into the flash memory chip 106 is converted by the memory interface 1047 into a format acceptable to the flash memory chip 106.

In another exemplary embodiment of the present invention, the memory controller 104 further includes a power management circuit 3002. The power management circuit 3002 is coupled to the memory management circuit 1043 and controls the power supply of the memory storage device 100.

In yet another exemplary embodiment of the present invention, the memory controller 104 further includes an error checking and correcting (ECC) circuit 3004. The ECC circuit 3004 is coupled to the memory management circuit 1043 and executes an ECC procedure to ensure data accuracy. To be specific, when the memory management circuit 1043 receives a write command from the host system 1000, the ECC circuit 3004 generates a corresponding ECC code for the data corresponding to the write command, and the memory management circuit 1043 writes the data corresponding to the write command and the corresponding ECC code into the flash memory chip 106. Subsequently, when the memory management circuit 1043 reads the data from the flash memory chip 106, it also reads the ECC code corresponding to the data, and the ECC circuit 3004 executes the ECC procedure on the data according to the ECC code.

Generally speaking, the memory storage device 100 can process about 10,000 commands issued by the host system 1000 during every second. Namely, the execution time of each command is about 100 μs. However, after the memory storage device 100 finishes processing a command and sends an acknowledgement message to the host system 1000, the host system 1000 has to wait for some time (about 40 μs) before it issues a new command. Obviously, if the memory storage device 100 has to spend about 40 μs to wait for the host system 1000 to issue a new command every time after the memory storage device 100 finishes processing a command, the time of the memory storage device 100 waiting for the new command will take up 40% of the execution time of the command, and accordingly the efficiency of the memory storage device 100 in command executing will be reduced.

Figure 4:
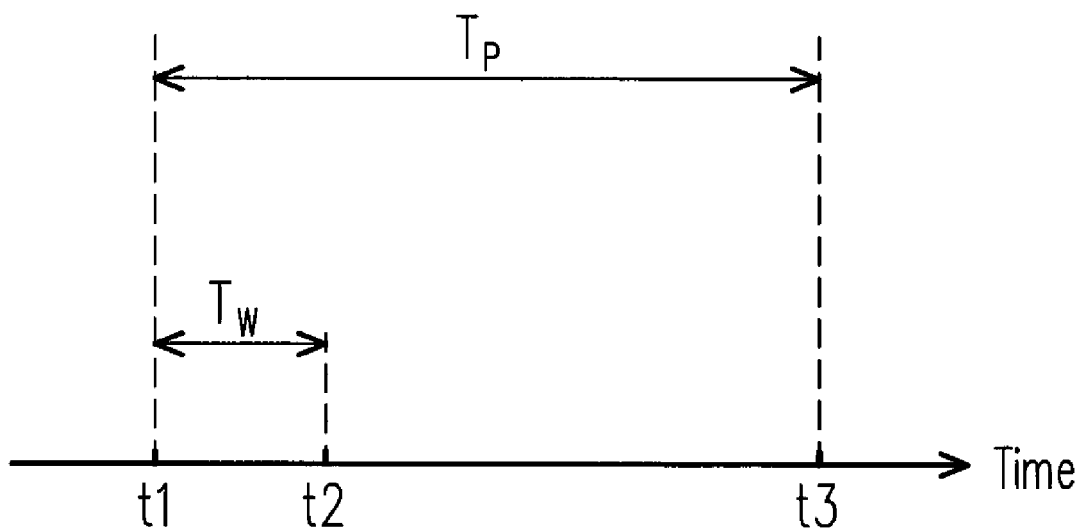
FIG. 4 is a diagram illustrating the timing of two commands issued by a host system.

However, if the memory storage device 100 always sends an acknowledgement message to the host system 1000 in advance in order to reduce the idle time thereof, the problem of execution timeout of the new command may be produced. To be specific, as shown in FIG. 4, it is assumed that the host system 1000 issues a write command CMD_1 to the memory storage device 100, and at time point $t_1$, the host system 1000 completely transfers data corresponding to the write command CMD_1 to the buffer memory 1045. If the memory storage device 100 sends the acknowledgement message to the host system 1000 at time point $t_1$, the host system 1000 can issue another command CMD_2 to the memory storage device 100 at time point $t_2$ (after a waiting time $T_w$ (about 40 μs)). However, if the memory storage device 100 still needs a processing time $T_p$ for executing the write command CMD_1 after the data is completely transferred to the buffer memory 1045, the memory storage device 100 cannot start to process the command CMD_2 at time point $t_2$; instead, the memory storage device 100 has to wait until time point $t_3$. If the write command CMD_1 causes the memory storage device 100 to trigger a data moving procedure, since based on statistical data, about 0.5 second is required to finish the data moving procedure, the period from time point $t_2$ to time point $t_3$ is too long, which causes the command CMD_2 to time out.

Accordingly, in order to improve the efficiency of the memory storage device 100 in command processing and prevent execution timeout of a new command, in the present exemplary embodiment, when the memory management circuit 1043 of the memory storage device 100 receives a command issued by the host system 1000, it determines whether the command needs a long execution time. If the execution time of the command is not very long, the memory management circuit 1043 of the memory storage device 100 sends an acknowledgement message to the host system 1000 before the execution of the command is really completed, so that the host system 1000 can issue a new command in advance. However, in order to prevent execution timeout of the new command when the memory management circuit 1043 is performing a time-consuming operation, the memory management circuit 1043 sends the acknowledgement message to the host system 1000 only after the execution of the current command is actually completed if it determines that the current command requires a longer execution time.

Among various commands issued by the host system 1000 to the memory storage device 100, the execution time of write commands that require physical blocks to be merged or wear leveling to be performed and accordingly cause the memory storage device 100 to trigger a data moving procedure is much longer than those of general write, read, and erase commands. Accordingly, the present invention will be described below by assuming that a write command issued by the host system 1000 is received.

To be specific, when the host system 1000 is about to write data into the memory storage device 100, the memory controller 104 receives a write command from the host system 1000 through the connector 102 and stores data received from the host system 1000 into the buffer memory 1045. When the host system 1000 is transferring the data, the memory management circuit 1043 determines whether the write command requires a longer execution time. Namely, the memory management circuit 1043 determines whether a data moving procedure is triggered (for example, data moving operations incurred by merging physical blocks or executing a wear leveling operation). In the present exemplary embodiment, the memory management circuit 1043 determines whether the write command triggers a data moving procedure according to whether the number of available physical blocks is smaller than a predetermined threshold or a specific variable (for example, a variable generated while executing a wear leveling operation or any other variable that causes data moving).

If the write command does not trigger the data moving procedure, the memory management circuit 1043 sends an acknowledgement message corresponding to the write command to the host system 1000 after the corresponding data is completely transferred to the buffer memory 1045. However, if the write command causes the memory management circuit 1043 to execute a data moving procedure on the flash memory chip 106, the memory management circuit 1043 sends the acknowledgement message to the host system 1000 only after the data moving procedure is executed. After the host system 1000 receives the acknowledgement message from the memory storage device 100, it issues another command to the memory storage device 100.

Because the host system 1000 needs to wait for some time after receiving the acknowledgement message memory storage device 100 to issue a new command (i.e., after processing a command received from the host system 1000, the memory storage device 100 needs to wait for at least aforementioned waiting time to receive and process a new command), the memory management circuit 1043 notifies the host system 1000 to issue a new command before it actually finishes processing the current command (for example, data corresponding to the write command has not been written into the flash memory chip 106), so that the efficiency of the memory storage device 100 for executing commands issued by the host system 1000 is improved.

Additionally, when a write command issued by the host system 1000 triggers a data moving procedure therefore requires a longer execution time, in order to shorten the time from receiving a new command to executing the new command, the memory management circuit 1043 responds the host system 1000 after the data moving procedure is completed, so that timeout of the new command is avoided.

In following exemplary embodiment, the memory management circuit 1043 determines the time point for sending the acknowledgement message to the host system 1000 by setting a determination parameter and checking the value of the determination parameter at specific time points.

To be specific, after the host system 1000 issues a write command to the memory storage device 100, the memory management circuit 1043 sets a determination parameter to a first specific value and notifies the host system 1000 to transfer the corresponding data. At the same time when the data is being transferred to the buffer memory 1045, the memory management circuit 1043 determines whether the write command triggers a data moving procedure. After the host system 1000 transfers the data completely to the buffer memory 1045, the host system 1000 issues an interrupt command to the memory storage device 100.

If the memory management circuit 1043 determines that the write command does not trigger the data moving procedure, the memory management circuit 1043 sets the determination parameter to a second specific value. Herein if the memory storage device 100 receives the interrupt command from the host system 1000 (which means the data has been completely transferred to the buffer memory 1045), the memory management circuit 1043 checks the determination parameter is the first specific value or the second specific value. Because the determination parameter is set to the second specific value, even if the execution of the write command has not been completed, the memory management circuit 1043 still sends the acknowledgement message to the host system 1000 in advance to notify the host system 1000 that a next command can be issued. Next, the memory management circuit 1043 continues to perform operations corresponding to the write command (i.e., moves the corresponding data from the buffer memory 1045 to the flash memory chip 106). Because the write command does not cause the memory management circuit 1043 to execute the data moving procedure in this case, even though the host system 1000 issues a new command to the memory storage device 100 right after, the new command can be instantly executed and no timeout will be produced.

However, if the memory management circuit 1043 determines that the write command triggers a data moving procedure, the memory management circuit 1043 does not change the value of the determination parameter but gets to execute the data moving procedure. If the memory storage device 100 receives an interrupt command from the host system 1000 when the memory management circuit 1043 executes the data moving procedure, since the memory management circuit 1043 determines that the determination parameter is still the first specific value (i.e., the current write command requires a longer execution time), the memory management circuit 1043 does not send the acknowledgement message to the host system 1000 so as to avoid such situation that a new command is received too soon and accordingly times out. The memory management circuit 1043 continues to execute the data moving procedure and sets the determination parameter to the second specific value after the data moving procedure is completed. Thereafter, if an interrupt command issued by the host system 1000 is received, the memory management circuit 1043 sends the acknowledgement message to the host system 1000. Besides, the memory management circuit 1043 moves the corresponding data from the buffer memory 1045 to the flash memory chip 106 to complete the write command.

In other words, regardless of what processing operation the memory management circuit 1043 is executing when the host system 1000 issues the interrupt command, the memory management circuit 1043 can always determine whether to send the acknowledgement message later or instantly to the host system 1000 by checking the determination parameter is the first specific value or the second specific value. Since there are only a small number of write commands that will trigger a data moving procedure, in most cases, the acknowledgement message is sent to the host system 1000 in advance so that the host system 1000 can issue a next command in advance and the waiting time of a next command can be shortened. Besides, timeout of a next command can be avoided when a time-consuming data moving procedure is executed.

Figure 5A:
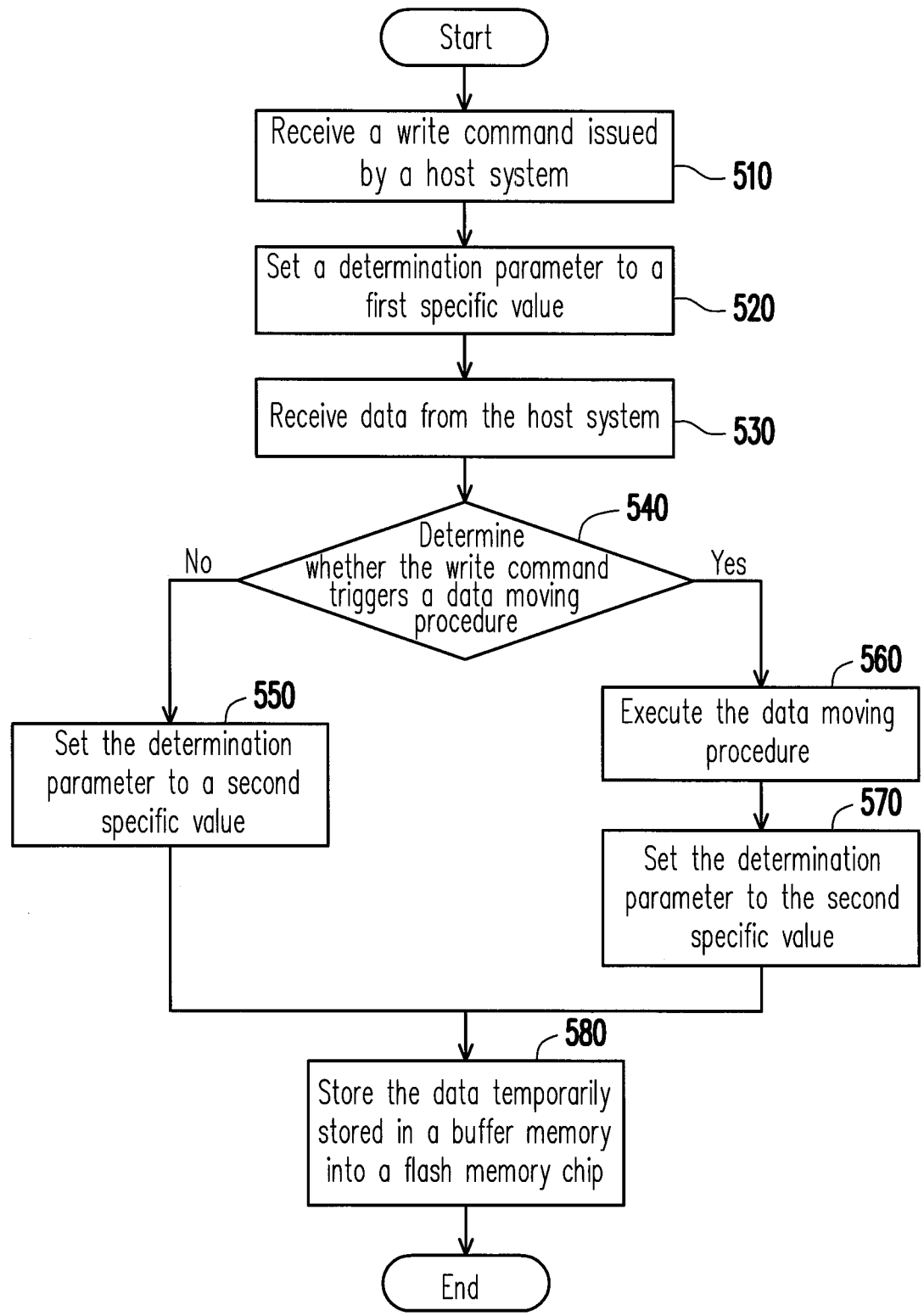
FIG. 5A and FIG. 5B are flowcharts of a host command responding method according to an exemplary embodiment of the present invention.
Figure 5B:
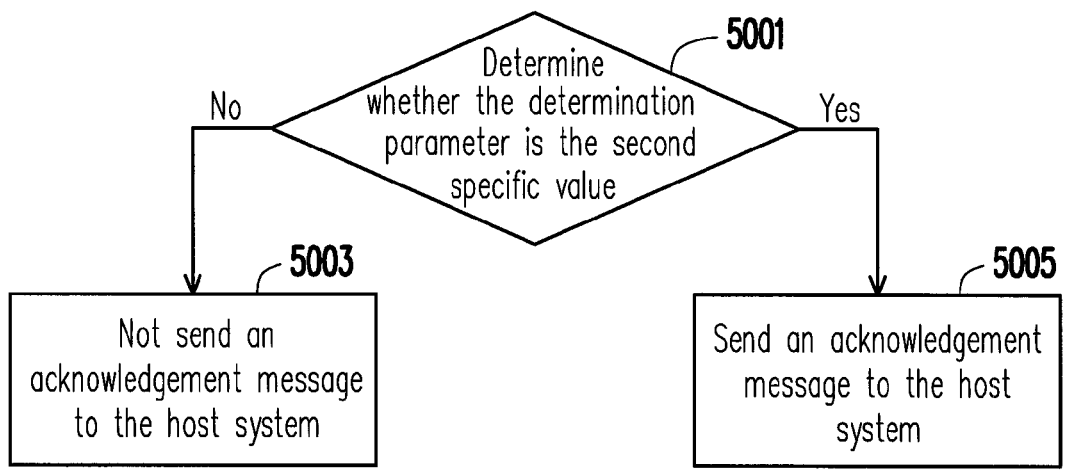

FIG. 5A and FIG. 5B are flowcharts of a host command responding method according to an exemplary embodiment of the present invention.

Referring to FIG. 5A, in step 510, the memory storage device 100 receives a write command issued by the host system 1000. Herein the memory management circuit 1043 notifies the host system 1000 to transfer the corresponding data.

Then, in step 520, the memory management circuit 1043 sets a determination parameter to a first specific value.

In step 530, the memory storage device 100 receives the data from the host system 1000 and temporarily stores the data into the buffer memory 1045. In step 540, the memory management circuit 1043 determines whether the write command triggers a data moving procedure. Herein the memory management circuit 1043 executes step 540 at the same time when the host system 1000 transfers the data.

If the write command does not trigger the data moving procedure, in step 550, the memory management circuit 1043 sets the determination parameter to a second specific value.

However, if the write command triggers the data moving procedure, in step 560, the memory management circuit 1043 executes the data moving procedure. After the data moving procedure is executed, in step 570, the memory management circuit 1043 sets the determination parameter to the second specific value.

In final step 580, the memory management circuit 1043 stores the data temporarily stored in the buffer memory 1045 into the flash memory chip 106 to complete the write command.

When the steps illustrated in FIG. 5A are executed, once the host system 1000 completely transfers the corresponding data to the buffer memory 1045, the host system 1000 issues the interrupt command to the memory storage device 100. When the memory management circuit 1043 receives the interrupt command from the host system 1000, in step 5001 illustrated in FIG. 5B, the memory management circuit 1043 checks whether the determination parameter is the second specific value. If the determination parameter is not the second specific value, in step 5003, the memory management circuit 1043 does not send the acknowledgement message to the host system 1000. If the determination parameter is the second specific value, the memory management circuit 1043 sends the acknowledgement message to the host system 1000.

As shown in FIG. 5A and FIG. 5B, the memory management circuit 1043 does not send the acknowledgement message to the host system 1000 before the determination parameter is set to the second specific value. After the determination parameter is set to the second specific value, regardless of whether the write command is completed, the memory management circuit 1043 always sends the acknowledgement message to the host system 1000 as long as it receives the interrupt command from the host system 1000.

In summary, the present invention provides a host command responding method, a memory controller, and a memory storage device, wherein when a write command is received from a host system, the time point for sending an acknowledgement message corresponding to the write command to the host system is determined according to whether the write command causes the memory storage device to trigger a data moving procedure. Accordingly, regarding a write command that does not trigger the data moving procedure, the acknowledgement message is sent in advance to allow the host system to issue another command to the memory storage device in advance, so that the efficiency of the memory storage device in command processing can be improved. Moreover, regarding a write command that triggers a data moving procedure, the corresponding acknowledgement message is sent to the host system after the data moving procedure is completed, so as to prevent timeout of a next command. The advantages aforementioned not required in all versions of the present invention.

It will be apparent to those skilled in the art that various modifications and variations can be made to the structure of the present invention without departing from the scope or spirit of the present invention. In view of the foregoing, it is intended that the present invention cover modifications and variations of this present invention provided they fall within the scope of the following claims and their equivalents.

What is claimed is:

1. A method for responding host commands, adaptable to a memory storage device having a flash memory chip and a buffer memory, the method comprising:
   receiving a write command from a host system;
   determining whether the write command causes the memory storage device to trigger a data moving procedure; and
   when the write command does not cause the memory storage device to trigger the data moving procedure, sending an acknowledgement message corresponding to the write command to the host system after a data corresponding to the write command is completely transferred to the buffer memory.

2. The method according to claim 1, wherein the data moving procedure comprises data moving operations incurred by merging physical blocks of the flash memory chip or data moving operations incurred by executing a wear leveling operation on the flash memory chip.

3. The method according to claim 1, wherein after the step of determining whether the write command causes the memory storage device to trigger the data moving procedure, the method further comprises:
   when the write command causes the memory storage device to trigger the data moving procedure, sending the acknowledgement message to the host system after the data moving procedure is executed completely.

4. The method according to claim 1, wherein after the step of receiving the write command issued by the host system, the method further comprises:
   setting a determination parameter to a first specific value.

5. The method according to claim 4 further comprising:
   when the write command does not trigger the data moving procedure, setting the determination parameter to a second specific value; and
   when the write command triggers the data moving procedure, setting the determination parameter to the second specific value after the data moving procedure is executed completely.

6. The method according to claim 5 further comprising:
   when an interrupt command issued by the host system is received, determining the determination parameter is the first specific value or the second specific value;
   when the determination parameter is the first specific value, not sending the acknowledgement message to the host system; and
   when the determination parameter is the second specific value, sending the acknowledgement message to the host system.

7. The method according to claim 6, wherein the interrupt command is issued to the memory storage device when the host system determines that the data is completely transferred to the buffer memory.

8. A memory controller, comprising:
   a host interface, for coupling a host system;
   a memory interface, for coupling a flash memory chip;
   a buffer memory; and
   a memory management circuit, coupled to the host interface, the memory interface, and the buffer memory, for receiving a write command from the host system and determining whether the write command triggers a data moving procedure,
   wherein when the write command does not trigger the data moving procedure, the memory management circuit further sends an acknowledgement message corresponding to the write command to the host system after a data corresponding to the write command is completely transferred to the buffer memory.

9. The memory controller according to claim 8, wherein the data moving procedure comprises data moving operations incurred by merging physical blocks of the flash memory chip or data moving operations incurred by executing a wear leveling operation on the flash memory chip.

10. The memory controller according to claim 8, wherein when the memory management circuit determines that the write command triggers the data moving procedure, the memory management circuit further sends the acknowledgement message to the host system after the data moving procedure is executed completely.

11. The memory controller according to claim 8, wherein the memory management circuit further sets a determination parameter to a first specific value after receiving the write command issued by the host system.

12. The memory controller according to claim 11, wherein the memory management circuit further sets the determination parameter to a second specific value when the write command does not trigger data moving procedure and sets the determination parameter to the second specific value after the data moving procedure is executed completely when the write command triggers the data moving procedure.

13. The memory controller according to claim 12, wherein the memory management circuit further determines the determination parameter is the first specific value or the second specific value when an interrupt command issued by the host system is received,
   when the determination parameter is the first specific value, the memory management circuit does not send the acknowledgement message to the host system, when the determination parameter is the second specific value, the memory management circuit sends the acknowledgement message to the host system.

14. The memory controller according to claim 13, wherein the interrupt command is issued to the memory management circuit when the host system determines that the data is completely transferred to the buffer memory.

15. A memory storage device, comprising:
a connector, for coupling a host system;
a flash memory chip; and
a memory controller, coupled to the flash memory chip and the connector, wherein the memory controller comprises a buffer memory,
the memory controller receives a write command issued by the host system and determines whether the write command triggers a data moving procedure,
when the write command does not trigger the data moving procedure, the memory controller further sends an acknowledgement message corresponding to the write command to the host system after a data corresponding to the write command is completely transferred to the buffer memory.

16. The memory storage device according to claim 15, wherein the data moving procedure comprises data moving operations incurred by merging physical blocks of the flash memory chip or data moving operations incurred by executing a wear leveling operation on the flash memory chip.

17. The memory storage device according to claim 15, wherein when the memory controller determines that the write command triggers the data moving procedure, the memory controller further sends the acknowledgement message to the host system after the data moving procedure is executed completely.

18. The memory storage device according to claim 15, wherein the memory controller further sets a determination parameter to a first specific value after receiving the write command issued by the host system.

19. The memory storage device according to claim 18, wherein the memory controller further sets the determination parameter to a second specific value when the write command does not trigger the data moving procedure and sets the determination parameter to the second specific value after the data moving procedure is executed completely when the write command triggers the data moving procedure.

20. The memory storage device according to claim 19, wherein the memory controller further determines the determination parameter is the first specific value or the second specific value when an interrupt command issued by the host system is received,
when the determination parameter is the first specific value, the memory controller does not send the acknowledgement message to the host system,
when the determination parameter is the second specific value, the memory controller sends the acknowledgement message to the host system.

21. The memory storage device according to claim 20, wherein the interrupt command is issued to the memory controller when the host system determines that the data is completely transferred to the buffer memory.

* * * * *